United States Patent
Critchley et al.

(10) Patent No.: US 7,421,501 B2
(45) Date of Patent: Sep. 2, 2008

(54) QUEUED SESSIONS FOR COMMUNICATING CORRELATED MESSAGES OVER A NETWORK

(75) Inventors: Craig A. Critchley, Fall City, WA (US); Richard Dievendorff, Bellevue, WA (US); Krishnan Srinivasan, Kirkland, WA (US); Richard Hill, Kirkland, WA (US); Uday Hegde, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 804 days.

(21) Appl. No.: 11/050,990

(22) Filed: Feb. 4, 2005

(65) Prior Publication Data
US 2006/0177069 A1 Aug. 10, 2006

(51) Int. Cl.
G06F 15/16 (2006.01)
G06F 12/00 (2006.01)

(52) U.S. Cl. .................................................... 709/227

(58) Field of Classification Search ................ 709/206, 709/207, 217, 218, 226, 227, 230, 250
See application file for complete search history.

(56) References Cited

U.S. PATENT DOCUMENTS 6,301,608 B1 * 10/2001 Rochkind .................. 709/206
7,356,024 B1 * 4/2008 Yokoyama ................. 370/381
7,370,333 B2 * 5/2008 Mehta et al. ............... 719/313
2003/0217094 A1 * 11/2003 Andrews et al. ............ 709/201
2006/0146848 A1 * 7/2006 Kirstein et al. ............. 370/412

* cited by examiner

*Primary Examiner*—Zarni Maung
(74) *Attorney, Agent, or Firm*—Workman Nydegger

(57) ABSTRACT

Systems and methods in accordance with the present invention allow for messages to be delivered from one application to another over a network in discrete groupings or communication sessions. For example, a sending computer system sends a group of related messages to a queue at a recipient computer system. The recipient computer system identifies that the messages of the group are related, and initiates a session-oriented communication channel. The recipient computer passes the group of messages to an appropriate application, and opens a different, new session-oriented communication channel for a new group of messages that are not necessarily related to the first group of messages. In one implementation, an order identifier in each of the received messages instructs the recipient computer system on what order, if any, the messages in a group are to be processed by the specific application.

20 Claims, 3 Drawing Sheets

QUEUED SESSIONS FOR COMMUNICATING CORRELATED MESSAGES OVER A NETWORK

CROSS-REFERENCE TO RELATED APPLICATIONS

N/A

BACKGROUND OF THE INVENTION

1. The Field of the Invention

This invention relates to systems, methods, and computer program products for sending correlated messages from one application to another over a network in a secure and resource-efficient manner.

2. Background and Relevant Art

As computerized systems have increased in popularity, so also have the needs to interconnect computer systems in small networks, such as local area networks, as well as large or global networks such as the Internet. In general, computer systems and related devices are connected to a given network for a variety of reasons, whether, for example, to simply exchange personal electronic messages, or to sell merchandise, provide account information, to share files, and so forth. One will appreciate, however, that as computer systems have become increasingly more sophisticated for individual use, the challenges associated with interconnecting computer systems on a network have also increased.

In general, a computing system communicates a message to another computing system on a network by constructing the message with an application program, and then packaging the message in one or more ways so that the message can reach its destination appropriately. In particular, one or more components or modules at the sending computer system might add address or routing information to the message, while another component or module might encrypt the message so that it cannot be read in transit. The receiving computer system then takes the message, unpacks the data as appropriate, and processes the data. Thus, passing data between one or more applications at sending and receiving computers typically involves a number of applications, modules, components, protocols, and processing resources at multiple, different computer systems.

Unfortunately, there are a number of difficulties associated with some present queued message communication mechanisms. When receiving correlated messages from another computer, a receiving computer typically has to "peek" through (or query) each of the messages received to gain some context as to how, whether, or with what application the individual message is to be processed. The recipient computer also typically may have to do this "peek" or "query" function to determine whether messages are correlated in a group, such that they should be processed together. To peek or query messages in this manner, a module at the receiving computer system may need to deserialize the message, and then read several layers of headers in the message before realizing that the message needs to be processed by one application, and not another, or with another related message at the application, but not with an unrelated message, and so on. In some cases, this may require the receiving computer system to read several layers of headers in the message before realizing that the message needs to be processed by an entirely different computer system.

As such, the conventional systems for receiving, forwarding, and processing messages can pose a number of problems, particularly with related messages that are to be processed in a specific order or grouping. For example, one conventional method for processing messages in a group is to process messages in the order that they are received. Unfortunately, there is little guarantee that messages will each arrive at the receiving computer in the appropriate order in the group, or even in specific groupings. For example, any number of relay or processing mechanisms along the transit path of a message can delay one message compared with the next, causing messages to arrive out of order. This can be exacerbated when unrelated messages are received in an intermingled fashion with groups of related messages. Thus, a recipient computer system may need to read a significant amount of the message to get an appropriate context for how the message should be processed.

Besides potentially posing a problem from a resource processing standpoint, asking the recipient computer system to read (or "peek", or "query") an amount of the message before forwarding the message to an appropriate application can create other problems related to security. For example, if the processing context of a message cannot be ascertained until the message is unpacked, deserialized, or decrypted, sensitive information in the message may be vulnerable to interception by inappropriate applications or processes.

Accordingly, an advantage in the art can be realized with systems, methods, and computer program products that allow messages to be sent from one application to another over a network in a correlated fashion, and in an intended processing order or grouping, when appropriate. Furthermore, an advantage in the art can be realized with such systems and methods that allow messages to be sent over a network without requiring unintended applications or computer systems to deserialize or decrypt portions of the message before the messages are received by the appropriate application.

BRIEF SUMMARY OF THE INVENTION

The present invention solves one or more of the foregoing problems in the art with systems, methods, and computer program products that allow messages to be communicated in a correlated fashion as intended by queuing related messages through discrete communication sessions, and session-oriented channels. In particular, systems and methods in accordance with the present invention allow messages to be sent from one application to another in discrete communication sessions, such that a recipient computer system can process different groups of messages appropriately.

For example, in at least one implementation of the present invention, a method from a sending computer perspective comprises an act of creating a group of correlated messages to be processed at a recipient computer system, where one message in the group is a first message, and another message in the group is a last message. The method also comprises an act of creating a session-oriented communication channel for the group of messages, and sending the group of messages to an addressable queue at a recipient computer system. The method from the sending computer system perspective further comprises an act of creating a different, session-oriented communication channel for a different group of messages. Accordingly, implementations of the present invention allow a sending computer system to send correlated messages in discrete groupings through discrete communication sessions.

A method of the present invention from the recipient computer system perspective comprises an act of receiving one or more messages at a queue, where at least one of the messages is identifiable as a first message of a group of correlated messages. The method also comprises an act of creating a session-oriented communication channel for the group of correlated messages, and ultimately receiving one or more of the remaining messages of the group, such as the last message of the group. Upon receiving the last message of the group, and the recipient computer system is aware all messages in the session have been received, and/or after processing all of the received correlated messages in the group, the session channel is closed. Upon receiving a first message of a different group of correlated messages, the recipient computer creates a different session-oriented communication channel. Accordingly, implementations of the present invention allow the recipient computer system to correlate groups of messages using discrete session-oriented communication channels.

In addition, sufficiently related messages in a group do not need to be read in any depth for context, and are not intermingled with unrelated groups of messages at the recipient computer system. In addition, messages in a given communication session can be processed in a specified order or grouping as indicated by the sending computer system. As well, a group of correlated messages can also be partially processed by the specified application as the messages are received or sent, and when appropriate. Moreover, the application on the sender or receiver side can reattach to the partially processed group by creating a session channel with the session identifier that identifies the partially processed group. Furthermore, messages can be sent in a manner that accommodates variations in receive order due to delays during transit, message size, or due to transmission failures. Still further, implementations of the present invention allow intermittent routers to "pick" and "stick" the route of the plurality of messages, which are part of the same session, to the same receiving processing node.

Additional features and advantages of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and computer program products that allow messages to be communicated in a correlated fashion as intended by queuing related messages through discrete communication sessions, and session-oriented channels. In particular, systems and methods in accordance with the present invention allow messages to be sent from one application to another in discrete communication sessions, such that a recipient computer system can process different groups of messages appropriately.

For example, as will be understood from the present specification and claims, one aspect of the present invention involves combining aspects of queuing protocols with general aspects of communication sessions. Another aspect of the invention involves preparing and receiving correlated messages to be sent to specific queues, and then processed in a correlated fashion by a single processing node, or application. Still another aspect of the invention relates to identifying and processing messages in a session in a specific order, or as part of a group, as appropriate.

Figure 1:
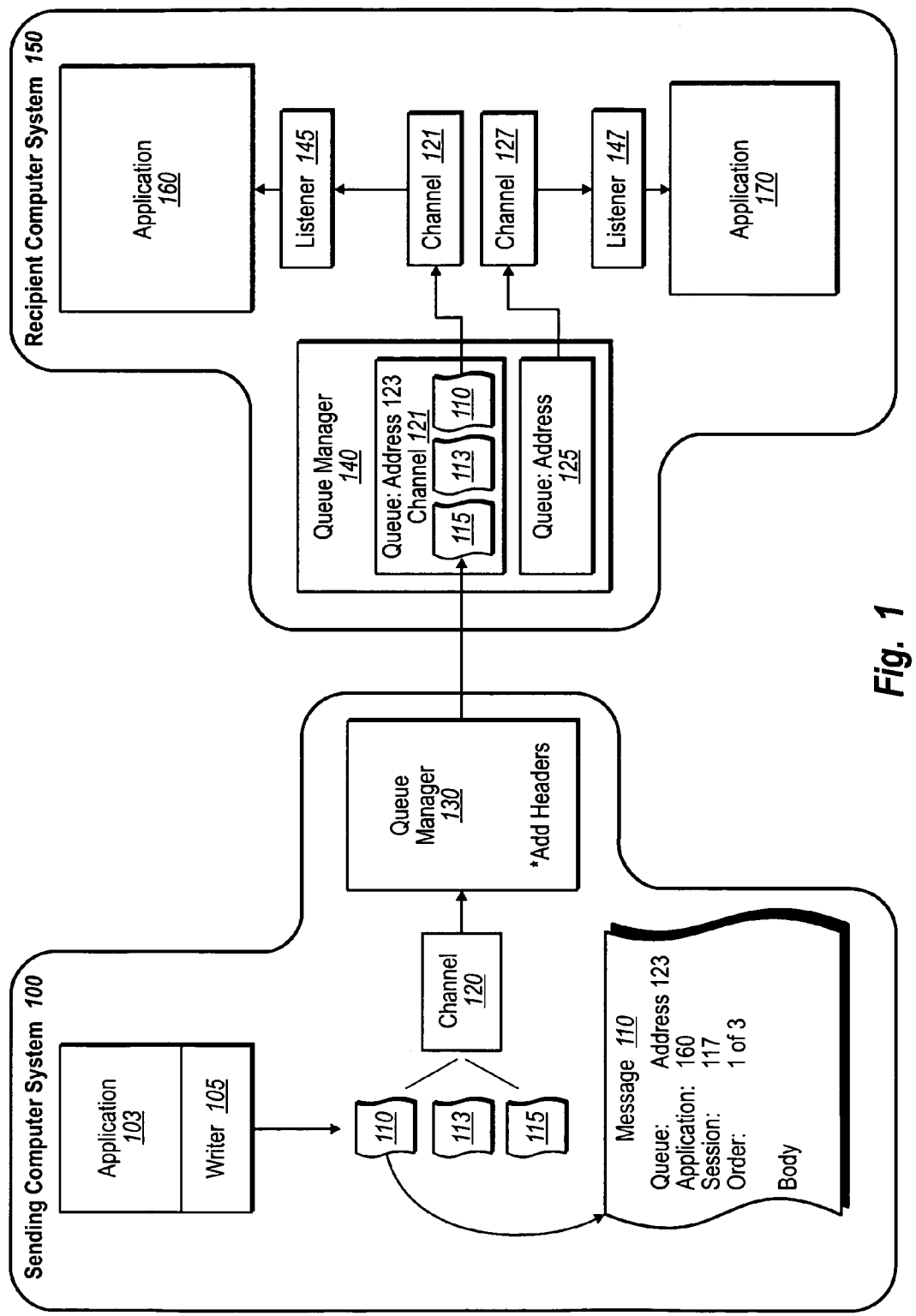
FIG. 1 illustrates an overview schematic diagram in accordance with the present invention for sending and receiving correlated messages to a recipient computer system.

For example, FIG. 1 illustrates an overview schematic diagram for practicing one or more implementations of the present invention. In particular, FIG. 1 shows that an application 103 at a sending computer system 100 creates one or more correlated messages 110, 113, and 115, which are to be processed in a correlated fashion, such as sequentially, or in any order as part of a group by a specific processing node. For example, a user might request one transaction that requires use of a certain application at an online bank, and then, after the transaction is completed, request another transaction at the online bank, which uses the same application, but necessarily requires a different set of correlated data from the user.

In general, if the sending computer system 100 is configured to do so, the sending computer system 100 initiates a discrete communication session, and a corresponding session-oriented channel 120. The sending computer system 100 need not necessarily understand session communication as described herein, so long as the sending computer system 100 is configured with mechanisms to correlate groups of messages in some way. For example, a sending computer system that does not implement communication sessions can simply correlate groups of messages by indicating that one message in a group is a first message, while another message in the group is a last message.

In general, a communication channel is simply a communication stack, such as a network stack having one or more layers that define a state of network communication. A session, on the other hand, will be understood as a discrete identifier for a group of correlated messages, such that one group of correlated messages are associated with one communication session, while another group of different, correlated messages are associated with a different communication session. A session-oriented channel, then, is a channel that is used to communicate a discrete session of messages. In some implementations of the present invention, a sending or recipient computer system will create one session-oriented communication channel for any given communication session. Although, it is possible in other implementations to have multiple communication channels in one session, and to have multiple communication sessions used in conjunction with one session-oriented channel.

In any event, FIG. 1 shows that each of the messages 110, 113, and 115, which are to be processed in the correlated fashion, are sent to the recipient computer system 150 initially through the session-oriented channel 120. Accordingly, the writer 105 can include session information in each message 110, 113, 115 that indicates that each of the messages are part of a correlated group, such that each message 110, 113, and 115 has a common session identifier. The writer 105 can also include header information about the ordering of the messages, such as whether the session is an ordered session, or that messages in the session can be processed in any order. If the session is to be an ordered session, the writer 105 can include an order identifier, which indicates, for example that message 110 is a first of three messages in a group.

The order identifier, however, is not required in all cases. For example, if a sending computer system 100 is not configured to implement sessions, but can identify that groups of messages are correlated, implementations of the present invention allow the recipient computer system 150 to associate the groups of messages with sessions, and then process the groups of messages in any arbitrary order at a single processing node. In particular, the recipient computer system 150 may process the messages 110, 113, and 115 however they are received, whether in or out of order, whether or not the messages are associated with an ordered or unordered session. Accordingly, implementations of the present invention are applicable to instances where ordering is, or is not, necessarily associated with a given group of correlated messages.

In addition, the application writer 105 can prepare the messages by including queue address 123 information, which identifies a specific session-oriented queue at the queue manager 140. The application writer 105 may also include state information for the communication channel 120 that is maintained by a local queue manager 130. In particular, state information for the communication channel can include, among other things, information that correlates each of messages 110, 113, and 115 as part of a specific session. As such, the queue manager 130 comprises one or more components or modules that interface with the application 103, and one or more layers of the session-oriented channel at the sending computer system 100. Furthermore, the queue manager 130 (and/or queue manager 140) is able to maintain state information for each of the layers in the channel communication stack, as well as state information that identifies that the grouping of messages 110, 113, 115, etc. are associated with the communication session 117. The queue managers 130, 140 can be localized to the sending and/or recipient computer system, and can also be remote, and hence present at an intermediate system on a routing path.

As shown in FIG. 1, the queue manager 130 can perform any number of appropriate functions, such as storing a correlated group of messages (i.e., a session) in a queue before sending the messages to the recipient queue manager 140. The queue manager 130 can also include one or more corresponding headers to the messages 110, 113, 115, as well as packaging each message for transport. In particular, the queue manager 130 can include state values in the given message header, where appropriate. The queue manager 130 can also encapsulate parts of each message 110, 113, 115 by inserting sensitive data structures within other data structures, so that the message can be tunneled to the addressed queue 123.

In addition, the queue manager 130 can add header information, such as "Via"
information in the case of Simple Object Access Protocol ("SOAP") messages, which helps ensure that the messages of a specific communication session are forwarded appropriately. SOAP header information such as this can be particularly helpful for intermediate routers that are "SOAP-aware". If an intermediate router in a connection path is SOAP-aware, the header information (e.g., a "Via") can help the intermediate router ensure that all messages received and passed in a specific communication session are forwarded to the appropriate node for processing.

If not already inserted by the application writer 105, the queue manager 130 can also insert a session identifier in the messages 110, 113, 115, which uniquely identifies the communication session for the specified group of correlated messages. Since a new, different session is created for each group of correlated messages that are to be processed differently from another group of correlated messages, each grouping of correlated messages will have a unique session identifier ("ID"). Thus, as shown in FIG. 1, message 110 includes information that the message is part of session 117. If messages 113, and 115 are provided with a session 117 identifier, the recipient computer system 150 will readily recognize each of message 110, 113, and 115 as part of a correlated group for processing.

FIG. 1 shows that the sending computer system 100 can address messages 110, 113, 115 directly to the addressed queue 123. In one implementation, relaying the messages involves passing the messages along one or more store and forward intermediaries (not shown) between the sending and/or recipient computer systems. One will also appreciate that the connection may fail at one or more points while the message (110, 113, and/or 115, etc.) is in transit. Nevertheless, at least in part since each message includes a session identifier that is unique for each group of messages, and where this information is available in a SOAP message header to SOAP-aware routers, connection pauses and failures can be accommodated.

In particular, messages in a failed, paused, or restarted communication session can still be routed to the appropriate processing node, and ultimately processed in the preferred order or grouping. For example, the sending computer system 100 may receive an indication that one of the messages (e.g., 113) in the session was not sent appropriately. The sending computer system 100 can simply reassociate the failed message with the appropriate session (e.g., 117) identifier information, and send the message again.

Furthermore, the application 103 at the sending computer system 100 (as well as the application 160 at the recipient computer system 150) can reattach to a communication session in the event the application 103 crashes. For example, while the application 103 is creating the one or more messages, the application 103 can store the current session(s) for the correlated message group(s) in an appropriate location. For example, if the application 103 crashes, the application 103 will create a new session-oriented channel, and also decide whether to use new session identifiers, or to recover session identifiers from storage. If the group has not been sent completely, the application 103 can simply associate the new session-oriented channel with a recovered session identifier. As will be understood from the discussion with respect to the recipient computer system 150, a similar process can occur where the application 160 associates a new session-oriented channel with a recovered session identifier after the application has crashed.

Thus, the sending computer system 100 (and the recipient computer system 150) can ensure that each of the messages 110, 113, and 115 are communicated appropriately as part of the appropriate session, regardless of the order in which they are sent or received with respect to the appropriate queue manager, and thus be able to send or process them as appropriate. Furthermore, processing resources are saved since the sending computer system 100 does not have to resend previously sent messages to the queue manager 130, and the recipient computer system 150 does not have to have all previously received messages resent from the queue manager 140.

When the recipient computer system 150 receives one or more of the messages in a group, a listener module 145 for a specific application 160 identifies that a group of correlated messages are being sent that will need to be processed by an application, such as application 160. In response, the listener 145 initiates a session-oriented channel 121 for relaying the received, correlated messages directly to the appropriate application. For example, the recipient computer system 150 identifies that a group of correlated messages are being received by identifying one or more session identifiers (e.g., 117) found in header information of the incoming messages 110, 113, etc. In another implementation, the recipient computer system 150 identifies that a group of correlated messages are being, or have been received, when the messages have some other correlation information, such as a "first message" or "last message" indicator.

In general, each of the messages in the communication session are received at the addressed queue 123, without having to be unpacked or read in any depth. As the messages 110, 113, and 115 are received, the queue manager 140 can momentarily store the messages, and the queue 123 can order the received messages as indicated in their respective order identifiers. Of course, if the session information of the messages in a session indicates that the session is unordered, then the queue 123 will not necessarily order the messages before processing. Thus, the order identifier will be implemented in situations where the session is indicated as an ordered session.

For example, FIG. 1 shows that the message 110 is one of three messages to be processed by application 160 in an ordered session. Another identifier in the received messages may indicate that the message 110 is to be processed simultaneously, or in any order to be consumed by a single processing node with the other messages 113 and 115, rather than in sequence. Thus, in one implementation, the queue 123 buffers each received message at the queue manager 140 until a sufficient number of messages are received to be ordered or processed as appropriate. This can be helpful for a number of reasons.

For example, message 115 might arrive earlier than message 113 due to some delay in a forwarding intermediary in the connection path. Alternatively, the transmission to the queue 123 may fail temporarily. Although the transmission can be restarted with the same group, there may be some faulty ordering in how the messages are sent to, or received at, queue 123. Nevertheless, since each message in an ordered session can be correlated with a specific order identifier, a wide variety of message delays can be accommodated with relative ease. Furthermore, since messages can be stored in a buffer when received, the application 103 and queue manager 130 can simply recreate messages with the appropriate session identifiers at the point in which a message was not relayed appropriately, rather than having to reprocess and retransmit previous, correctly transmitted messages.

In any event, FIG. 1 shows that the listener module 145 then takes the received messages 110, 113, and 115 in the appropriate order, and passes them through the session-oriented channel 121 to the application 160 for processing. FIG. 1 also shows that another listener 147 for another application 170 has identified other messages addressed to a different queue 125. Accordingly, listener 147 creates a different session-oriented channel 127, which is used to pass correlated messages received at queue address 125 on to application 170. Thus, FIG. 1 different listeners 145 and 147 can distinguish unrelated groups of correlated messages through different session-oriented channels 121, 127. Furthermore, individual listeners 145, 147, etc., can create multiple, yet distinct session-oriented communication channels from queues at the Queue Manager 140 to the same application 160, or 170, as appropriate.

In any event, after passing each of the received messages to the application 160, the listener module 145 identifies a last message and closes the session-oriented channel 121, or restarts a new, or different session for a new group of messages. For example, in one implementation, the last message is simply inferred an order identifier of the final message. That is, the listener module 145 identifies that message 115 represents the third of three messages, and that each of messages 110, and 113 were already received. Of course, the last message indicator could also be a separate message sent by the sending computer system after sending the last message (e.g., 115), or the message itself may contain an indicator that it is simply the last message sent by the sending computer system 100. As such, the listener module 145 can start a new, different session-oriented channel for new sessions of correlated messages, and can create such sessions simultaneously (or sequentially) for different groups of correlated messages. Thus, a variety of procedures on both the sending and receiving computer systems can be implemented to ensure the separation of unrelated groups of correlated messages.

Figure 2:
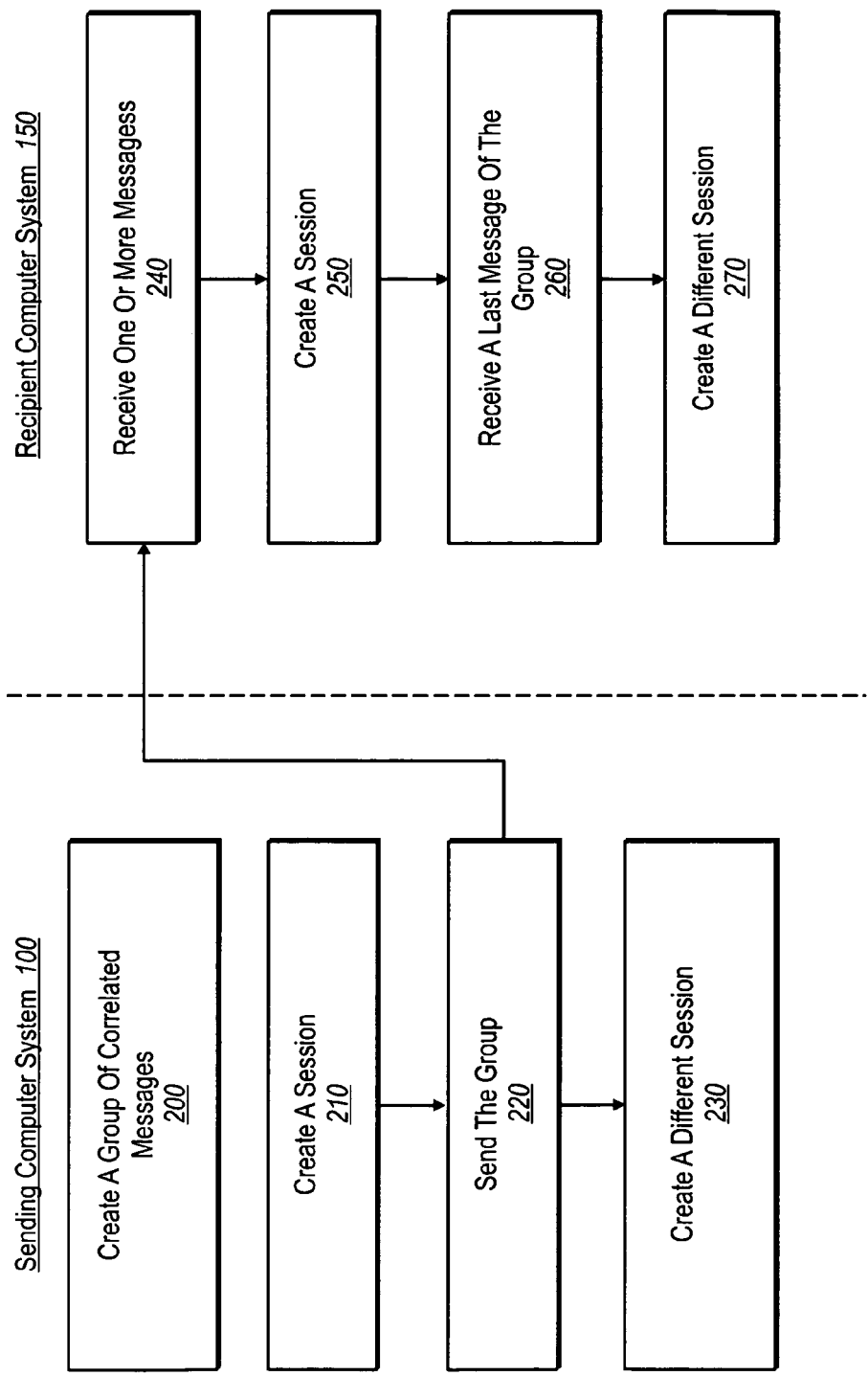
FIG. 2 illustrates methods from the sending and recipient computer system perspectives comprising acts of communicating correlated messages in accordance with the present invention.

FIG. 2 illustrates a series of acts in a method of communicating a plurality of correlated messages in a resource-efficient manner, such that the plurality of message can be processed by a specified application as intended. The acts of FIG. 2 will be discussed below with reference to FIG. 1, and includes acts from both the sending and recipient computer system perspectives. For example, FIG. 2 shows that a method in accordance with an implementation of the present invention from the sending computer perspective 100 comprises an act 200 of creating a group of correlated messages. Act 200 includes creating a group of correlated messages to be processed at a recipient computer system, wherein one message in the group is a first message, and another message in the group is a last message. For example, if the sending computer system 100 is configured for discrete communication sessions, the sending computer system 100 can create a group of correlated messages that each include a unique session ID. Alternatively, if the sending computer system 100 is not configured for sessions, the sending computer system 100 can correlate the messages by other mechanisms such that at least one message is identifiable as a first message in a group, and another message is identifiable as a last message in a group.

The method from the sending computer 100 perspective also comprises an act 210 of creating a session. Act 210 includes creating a session-oriented communication channel for the group of messages. For example, the sending computer system 100 initiates a session-oriented communication channel that has one or more state layers maintained by the queue manager 130. The queue manager 130 passes the session information for the initiated communication channel 120 to the application 103, and the application writer 105 inserts the session ID into each correlated message of the group. The application writer 105 can also insert header information that indicates that the session is an ordered session or that ordering is unimportant to processing, or that the group of messages are to be processed in any order by a single processing node. In some instances in the case of ordered sessions, the write interface 105 can also insert in each message an order indicator (e.g., "one of three") that indicates the specific order in which the message should be ordered and processed. These and similar insertion functions can be performed alternatively, or in a shared fashion, by the application 103 and/or the queue manager 130.

The method from the sending computer 100 perspective also comprises an act 220 of sending the group. Act 220 includes sending a group of messages to an addressable queue at the recipient computer system. For example, after at least one of the plurality of messages have been prepared, the sending computer system 100 sends the correlated messages 110, 113, and 115 of the group to the addressed queue 123 at the queue manager 140. As the messages are relayed to their ultimate destination at the recipient computer system 140, the messages may also be relayed through one or more store and forward points, where the messages are buffered for one or more purposes. As previously indicated, if the sending computer system 100 receives an indication that one of the correlated messages has failed, or has not been sent appropriately, the sending computer system 100 can simply reassociate the message with the appropriate session ID, and send the message again. Ultimately, each message in the plurality is relayed to the specified session-oriented queue 123 at the recipient computer system 140.

In addition, FIG. 2 shows that the method from the sending computer 100 perspective further comprises an act 230 of creating a different session. Act 230 includes creating a different session-oriented communication channel for a different group of correlated messages. For example, concurrently with the set of messages, or after the last message 115 of the group of messages has been created, or sent appropriately, the application 103 initiates a new communication session (not shown) for a new, different group of correlated one or more messages (not shown). Of course, if there are no more messages to be sent, then a new session does not necessarily need to be created. Nevertheless, the application ensures that each set of correlated messages that are to be processed in a correlated fashion are only associated with one discrete session identifier, such that different groups each have a different session identifier.

As indicated, FIG. 2 also shows a method from the recipient computer 150 perspective of processing a group of correlated messages in a resource-efficient manner, such that the plurality of messages can be processed as intended. In particular, FIG. 2 shows that the method from the receiving side comprises an act 240 of receiving one or more messages. Act 240 includes receiving one or more messages at a queue, wherein at least one of the messages is identifiable as a first message of a group of correlated messages. For example, if the recipient computer system 150 is receiving a group of messages from a sending computer system that is configured to understand communication sessions, the recipient computer system readily identifies a correlated group by identifying session information that is included in the message headers. Alternatively, if the sending computer system 100 is not configured to implement communication sessions, but is configured to work with message groupings, the recipient computer system 150 identifies a correlated grouping with other indicia, such as by identifying a first message and last message indicator in a group of received messages.

The method of FIG. 2 from the recipient computer 150 perspective also comprises an act 250 of creating a session. Act 250 includes creating a session-oriented communication channel for the group of messages. The listener module 145 at the recipient computer system 150 initiates a session-oriented communication channel 121, which is used to pass messages from queue 123 to the application 160. When the messages are ordered appropriately at the queue manager 140 in the case of ordered sessions, the session-oriented channel 121 is used to pass received messages 110, 113, and 115 to application 160. Where appropriate, this can be done as the messages are received, such that the application 170 can partially process groups of correlated messages. Alternatively, such as in the case of unordered sessions, the messages may be passed through the session-oriented channel to the application 160 once all messages are received, and/or as soon as a new session-oriented channel is initiated for a new group of correlated messages that are not related to the group of messages.

Accordingly, the method of FIG. 2 from the recipient computer 150 perspective also comprises an act 260 of receiving a last message of the group. Act 260 includes receiving a last message of the group of messages. For example, a message 110 can include an order identifier that the message is to be processed in as a first message in a sequence of three messages. Alternatively, in another implementation, a separate message (not shown) included with each message in the plurality of messages acts as an index for the session of messages, and describes the number and order of each of the messages in the session, and how they should be processed. In any case, the last message indicates to the recipient computer system 150 that no more messages are to be sent through the session-oriented channel, assuming all other messages associated with the session have been received.

The method of FIG. 2 from the recipient computer perspective further comprises an act 270 of creating a different session. Act 270 includes, upon receiving a first message of a different group of correlated messages, creating a different, subsequent session-oriented communication channel. For example, in one implementation, the listener module 145 keeps the session-oriented channel available until identifying a last message, or upon identifying that all of the messages in the session have been received and passed to the application 160 through the session-oriented channel 121. That is, the listener module 145 keeps the session-oriented channel open until, for example, each of messages 110, 113, 115 are received, or, for example, "one of three", "two of three", and "three of three", and so forth have been received.

Upon receipt of a new message that is unrelated to the group of messages, the listener 145 can initiate a different, communication session for a new grouping of messages. This allows the recipient computer system to arrange or organize groups of correlated messages into discrete sessions. This further allows the recipient computer system 150 and sending computer system 100 to ensure messages are processed as groups, and/or in specified orders, where appropriate. As such, different groups of correlated messages (not shown) that are sent as part of another session or grouping will not be processed inadvertently with another group of correlated messages.

Accordingly, implementations of the present invention provide a number of ways in which groups of messages can be sent and processed in a prescribed manner, without requiring each message in the grouping to be unpacked and read in any significant way. Furthermore, implementations of the present invention allow messages in a specific communication session (ordered or non-ordered) to be sent in a queued manner, such that correlated messages can be processed in an order (or lack thereof) specified by the sending computer system, and at a single processing node. Still further, since messages in a session can be associated with a session identifier, implementations of the present invention provide for transmission and even application failure. For example, implementations of the present invention allow the sending and receiving queue managers to stop and start transmission at various sequences in the transmission, and/or to restart an association with a recovered session identifier without requiring the sending or receiving computer system to send or receive duplicate prior data.

In addition, since messages can be grouped in specific communication sessions that are addressed to a specific queue and session-oriented channel, implementations of the present invention provide for messages to be appropriately grouped, and not intermingled with other groups of correlated messages. In one instance, this provides resource-efficiency since the messages do not need to be sorted and weeded out of a grouping at the recipient computer system. Furthermore, particularly with messages such as SOAP messages, because each session can be addressed to a specific queue in the message headers, messages sent through a discrete communication session channel do not need to be deserialized or decrypted, such as for addressing purposes, until reaching the addressed queue or application.

Figure 3:
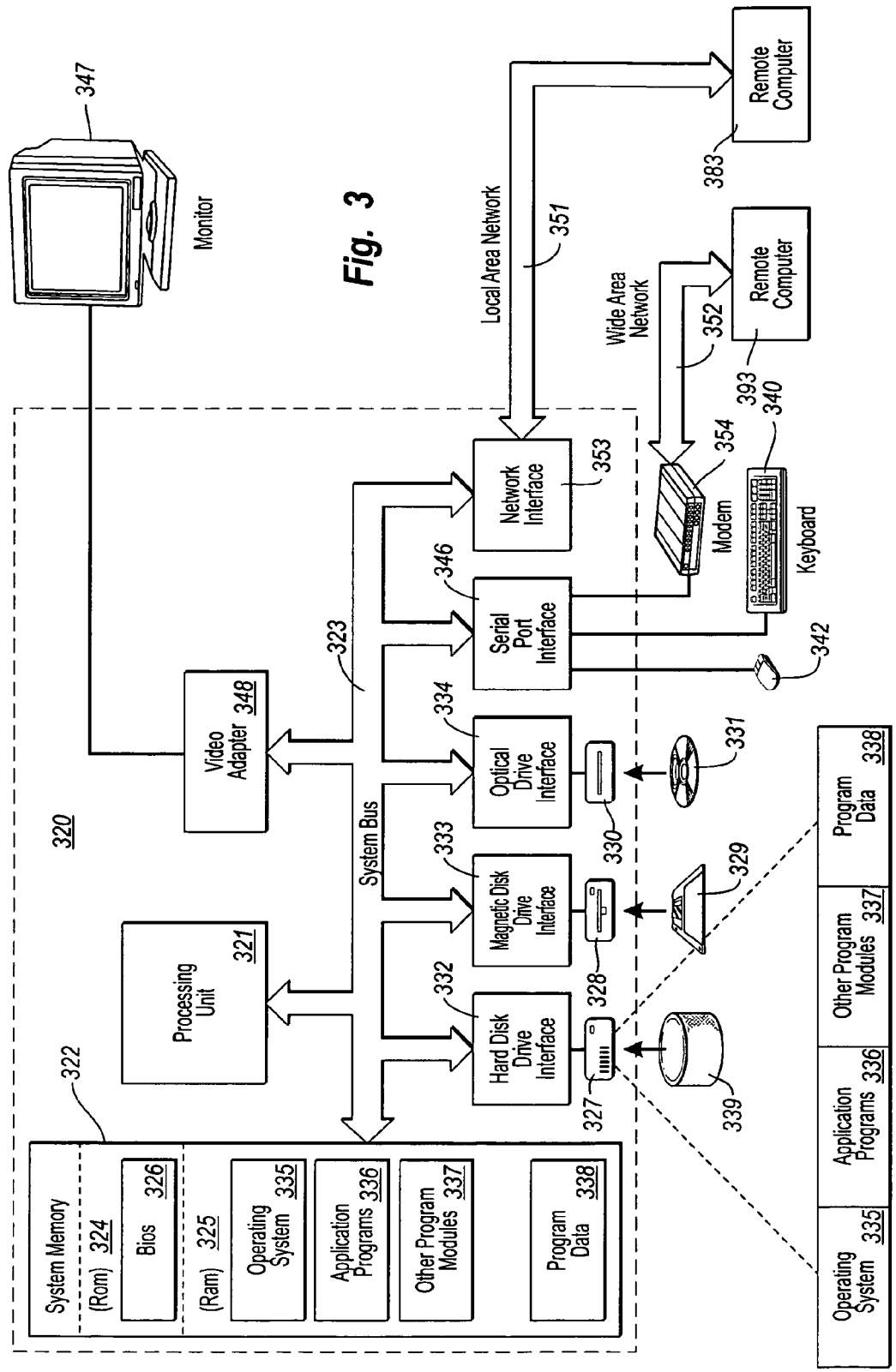
FIG. 3 illustrates a schematic diagram of a suitable computing environment for practicing one or more implementations of the present invention.

FIG. 3 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

With reference to FIG. 3, an exemplary system for implementing the invention includes a general-purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during start-up, may be stored in ROM 324.

The computer 320 may also include a magnetic hard disk drive 327 for reading from and writing to a magnetic hard disk 339, a magnetic disc drive 328 for reading from or writing to a removable magnetic disk 329, and an optical disc drive 330 for reading from or writing to removable optical disc 331 such as a CD ROM or other optical media. The magnetic hard disk drive 327, magnetic disk drive 328, and optical disc drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disc 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disc 331, ROM 324 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349a and 349b. Remote computers 349a and 349b may each be another personal computer, a server, a router, a network PC, a peer device or other common network node, and typically include many or all of the elements described above relative to the computer 320, although only memory storage devices 350a and 350b and their associated application programs 336a and 336b have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. At a sending computer system in a computerized environment in which an application at a sending system sends a group of correlated messages to be processed at a recipient computer system, a method of communicating the plurality of messages in a resource-efficient manner, such that the correlated messages can be processed as intended, comprising the acts of:
   creating a group of correlated messages to be processed at a recipient computer system, wherein one message in the group is a first message, and another message in the group is a last message;
   creating a session-oriented communication channel for the group of messages;
   sending the group of messages to an addressable queue at a recipient computer system; and
   creating a different session-oriented communication channel for a different group of correlated messages.

2. The method as recited in claim 1, further comprising sending the group of messages through the session-oriented communication channel, and sending the different group of correlated messages through the different session-oriented communication channel.

3. The method as recited in claim 2, wherein a queue manager maintains state of the session-oriented communication channel that the group of correlated messages is associated with the session.

4. The method as recited in claim 1, further comprising:
   receiving an indication that at least one of the messages in the group has not been sent to the recipient computer system appropriately;
   resending the message with the corresponding session identifier to indicate that the message is part of the group of correlated messages.

5. The method as recited in claim 1, wherein each of the messages of the group are associated with a session identifier, and wherein each of the messages of the different group are associated with a different session identifier.

6. The method as recited in claim 5, wherein the application at the sending computer system fails, the method further comprising:
   initiating a new session-oriented communication channel upon restarting the application; and
   recovering the session identifier associated with the session-oriented communication channel, such that the new session-oriented channel is associated with the session identifier that was used with the application before the application failed, and such that the application is reattached to the prior session.

7. The method as recited in claim 1, further comprising encapsulating any of the group of messages or different group of messages, such that the encapsulated group of messages or different group of messages are relayed through a tunneling protocol.

8. The method as recited in claim 1, wherein a router relays at least one of the messages in the group of correlated messages, at least a second of the messages in the group of correlated messages, and another message that is not part of the group of correlated messages, and wherein the router identifies that the at least one message and the at least a second message are associated with a common communication session, and that the another message is not associated with the common communication session.

9. The method as recited in claim 1, wherein at least the group of correlated messages is sent to the recipient computer system using a SOAP messaging protocol, the method further comprising inserting one or more Vias into a message header of each of the messages in the group.

10. The method as recited in claim 1, wherein the session-oriented channel is created for an ordered session, the method further comprising inserting an order identifier into each of the messages in the group of correlated messages.

11. At a recipient computer system in a computerized environment in which a plurality of received messages are correlated, a method of receiving and processing the plurality of correlated messages in a resource-efficient manner, such that the plurality of correlated messages can be processed as intended, comprising the acts of:
   receiving one or more messages at a queue, wherein at least one of the one or more messages is identifiable as a first message of a group of correlated messages;
   creating a session-oriented communication channel for the group of correlated messages;
   receiving a last message of the group of correlated messages; and
   upon receiving a first message of a different group of correlated messages, creating a different session-oriented communication channel.

12. The method as recited in claim 11, wherein the messages of the group of correlated messages comprise a communication session identifier, such that the recipient computer system initiates the session-oriented communication channel based on identifying the communication session identifier in any of the messages in the group of correlated messages.

13. The method as recited in claim 12, further comprising:
   identifying a different, new communication session identifier in the first message of the different group; and
   initiating the different session-oriented communication channel based on the new communication session identifier.

14. The method as recited in claim 11, further comprising:
   passing at least the first message of the group of correlated messages to a specific application through the session-oriented communication channel; and
   processing the at least the first message of the group of correlated messages at the specific application before receiving the last message of the group of correlated messages, such that the correlated messages of the group are partially processed.

15. The method as recited in claim 11, wherein the session-oriented communication channel is created for an ordered session, the method further comprising:
   identifying an order identifier in each of the messages of the group; and
   processing the messages of the group at the specific application in accordance with the order identifier.

16. The method as recited in claim 11, wherein the application at the recipient computer system fails, the method further comprising:
   initiating a new session-oriented communication channel upon restarting the application; and
   recovering the session identifier associated with the session-oriented communication channel, such that the new session-oriented channel is associated with the session identifier that was used with the application before the application failed, and such that the application is re-attached to the prior session.

17. The method as recited in claim 11, further comprising:
   receiving an indication that transmission of one of the messages in the group of correlated messages has failed;
   buffering other messages of the group of correlated messages that have been received;

receiving a new message; and identifying that the new message is part of the group of correlated messages based on a session identifier in the new message.

18. The method as recited in claim 11, wherein the session-oriented channel is initiated by a listener module associated with the specific application.

19. The method as recited in claim 11, wherein the group of messages are received and maintained at a destination queue of the recipient computer system, wherein the queue was specifically addressed by a sending computer system.

20. A computer program product for use at a recipient computer system in which a plurality of received messages are to be processed by a specific application, the computer program product comprising one or more computer-readable media having stored thereon computer-executable instructions that, when executed by a processor, cause the recipient computer system to perform a method of receiving and processing the plurality of correlated messages in a resource-efficient manner as intended, comprising the following:

receiving one or more messages at a queue, wherein at least one of the one or more messages is identifiable as a first message of a group of correlated messages;

creating a session-oriented communication channel for the group of correlated messages;

receiving a last message of the group of correlated messages; and upon receiving a first message of a different group of correlated messages, creating a different session-oriented communication channel.

\* \* \* \* \*